US012066791B2

(12) United States Patent
Bourg et al.

(10) Patent No.: US 12,066,791 B2
(45) Date of Patent: Aug. 20, 2024

(54) DIAL FOR A TIMEPIECE

(71) Applicant: ROLEX SA, Geneva (CH)

(72) Inventors: Benjamin Bourg, Annemasse (FR); Daniel Fiammingo, Sciez (FR); Grégoire Fluri, Lancy (CH); Laurent Mincone, Jonzier-Epagny (FR)

(73) Assignee: ROLEX SA, Geneva (CH)

( * ) Notice: Subject to any disclaimer, the term of this patent is extended or adjusted under 35 U.S.C. 154(b) by 744 days.

(21) Appl. No.: 16/951,611

(22) Filed: Nov. 18, 2020

(65) Prior Publication Data

US 2021/0157273 A1 May 27, 2021

(30) Foreign Application Priority Data

Nov. 26, 2019 (EP) .................................... 19211399

(51) Int. Cl.
*G04B 19/14* (2006.01)
*G04B 19/06* (2006.01)

(52) U.S. Cl.
CPC .......... *G04B 19/14* (2013.01); *G04B 19/065* (2013.01)

(58) Field of Classification Search
CPC ................................ G04B 19/14; G04B 19/06
See application file for complete search history.

(56) References Cited

U.S. PATENT DOCUMENTS 364,109 A 5/1887 Hart
1,059,203 A * 4/1913 Pettersen ............... G04B 19/14 968/157
3,545,197 A * 12/1970 Fischer .................. G04B 19/14 968/157
5,912,064 A 6/1999 Azma et al.
6,021,099 A 2/2000 Aoki et al.
6,053,631 A * 4/2000 Mock .................. G04B 39/025 368/294

(Continued)

FOREIGN PATENT DOCUMENTS

CH 330907 A 6/1958
CH 696987 A5 2/2008

(Continued)

OTHER PUBLICATIONS

European Search Report and Written Opinion dated May 20, 2020 in counterpart application No. EP19211399; with English machine translation (total 12 pages).

(Continued)

*Primary Examiner* — Edwin A. Leon
*Assistant Examiner* — Jason M Collins
(74) *Attorney, Agent, or Firm* — Seckel IP, PLLC

(57) ABSTRACT

A dial plate (1) for a timepiece is designed to be mounted on a connection ring (2), and has a first, lower surface (12) designed to be oriented towards the interior of a timepiece, an opposite second, upper surface (13) designed to be on view, and a third surface (11) connecting the first and second surfaces, forming a peripheral contour of the dial plate. The third, peripheral contour surface (11) includes a section which passes via a plane perpendicular to the second surface (13), this section having a first part (11*a*) extending from the first, lower surface (12) to the second, upper surface (13) of the dial plate (1), in a direction which is non-perpendicular to the first, lower surface (12).

21 Claims, 4 Drawing Sheets

(56) References Cited

U.S. PATENT DOCUMENTS

| | | | | |
|---|---|---|---|---|
| 6,762,976 | B1 * | 7/2004 | Tamaru | G04B 37/005 368/300 |
| 9,284,485 | B2 | 3/2016 | Berner et al. | |
| 9,348,314 | B2 | 5/2016 | Robin | |
| 9,535,403 | B2 * | 1/2017 | Tschumi | G04B 37/0008 |
| 9,920,245 | B2 | 3/2018 | Berner et al. | |
| 10,196,566 | B2 | 2/2019 | Berner et al. | |
| 2003/0012086 | A1 | 1/2003 | Gressly et al. | |
| 2011/0044138 | A1 | 2/2011 | Danthe et al. | |
| 2012/0236693 | A1 | 9/2012 | Hiranuma | |
| 2014/0124702 | A1 | 5/2014 | Berner et al. | |
| 2014/0160905 | A1 | 6/2014 | Robin | |
| 2015/0212491 | A1 | 7/2015 | Tschumi | |
| 2015/0252260 | A1 | 9/2015 | Berner et al. | |
| 2016/0137919 | A1 | 5/2016 | Berner et al. | |
| 2018/0173163 | A1 | 6/2018 | Kraehenbuehl | |
| 2019/0391533 | A1 | 12/2019 | Barfuss et al. | |
| 2021/0034018 | A1 * | 2/2021 | Jeanrenaud | G04B 19/065 |

FOREIGN PATENT DOCUMENTS

| | | | |
|---|---|---|---|
| CH | 705042 | A2 | 11/2012 |
| CH | 709401 | A2 | 9/2015 |
| CN | 1397853 | A | 2/2003 |
| CN | 101809513 | A | 8/2010 |
| CN | 102681421 | A | 9/2012 |
| CN | 106164785 | A | 11/2016 |
| EP | 0819995 | A1 | 1/1998 |
| EP | 2730636 | A1 | 5/2014 |
| EP | 2743783 | A1 | 6/2014 |
| EP | 3339970 | A1 | 6/2018 |
| JP | S51-47262 | U | 4/1976 |
| JP | S51-25149 | B1 | 7/1976 |
| JP | 2001-194470 | A | 7/2001 |

OTHER PUBLICATIONS

Extended European Search Report and Written Opinion dated Mar. 22, 2021 in counterpart application No. EP20208563.5; with English machine translation (total 16 pages) (D2-D5 cited in the European Search Report are not listed in this IDS since they were already listed in the IDS filed Nov. 18, 2020).

Chinese Office Action and Search Report dated Oct. 30, 2023 in application No. CN 202080082581.1, counterpart of co-pending U.S. Appl. No. 17/779,404 and of this application; with English machine translation (total 13 pages) (note: JP2001194470, D2 in the CN Office Action (D4 in the CN Search Report) and CH709401, D2 in the CN Search Report are not listed in this IDS since they are already of record).

International Search Report and Written Opinion dated Dec. 2, 2022 in application No. PCT/EP2020/075373; corresponding to co-pending U.S. Appl. No. 17/779,404; with English partial translation and partial machine translation (total 17 pages) (note: D2-D5 cited in the ISR and refs. 1-3 cited in the Specification of the co-pending application are not listed in this IDS since they were already listed in the IDS filed Nov. 18, 2020).

EP Office Action dated Jul. 27, 2023 in counterpart application No. EP20208563.5; with English machine translation (total 17 pages).

Chinese Office Action and Search Report dated Feb. 27, 2024 in application No. CN 202011345235.6, counterpart of this application and of co-pending U.S. Appl. No. 17/779,404; with English machine translation (total 15 pages) (note: D1-D4 cited in the CN Office Action, D1-D3, D5-D6 and D8 in the CN Search Report, are not listed in this IDS since they are already of record).

* cited by examiner

DIAL FOR A TIMEPIECE

This application claims priority of European patent application No. EP19211399.1 filed Nov. 26, 2019, the content of which is hereby incorporated by reference herein in its entirety.

INTRODUCTION

The present invention relates to a dial plate, a connection ring for a dial plate of this type, and a dial as such comprising the assembly of a dial plate and a connection ring. It also relates to a timepiece incorporating a dial of this type, such as a wristwatch.

PRIOR ART

A dial for a timepiece according to a first solution of the prior art is described by document EP3339970. A dial of this type comprises feet which are welded below a dial plate, which feet are designed to fasten the dial plate in a frame of a timepiece, for example by means of screws. This solution has the disadvantage of needing a material which is compatible with the welding in order to form the dial, whilst requiring intricate production and assembly operations, in particular welding of the feet then screwing in a frame. Furthermore, there is a risk of creating a situation of hyperstatism if the precision of the assembly is imperfect. Finally, this solution is incompatible with certain timepieces for which the volume available is very limited, and restricts the passage of screws for fastening of the dial, for example wristwatches which are equipped with multiple mechanical functionalities.

Other solutions, such as that described in document CH696987, require welding or gluing of two superimposed plates, which again involves the disadvantage of intricate production, whilst increasing the thickness of the dial over its entire surface.

Finally, the existing solutions do not make it possible to obtain a satisfactory result, and the general objective of the invention is to propose a dial solution for a timepiece which does not comprise the disadvantages of the prior art. More specifically, the invention seeks to achieve all or some of the following objectives.

A first objective of the invention is to propose a dial solution which is suitable for any type of material, and more particularly a fragile material, such as a ceramic.

A second objective of the invention is to propose a dial solution which makes it possible to combine simple production, and attractive incorporation in a timepiece, which solution is compatible with all timepieces, including wristwatches having a small volume available.

Finally, a third objective of the invention is to propose a dial solution which makes it possible to obtain reliable and robust fastening of the dial on a blank or a frame of a timepiece.

BRIEF DESCRIPTION OF THE INVENTION

For this purpose, the invention is based on a dial plate for a timepiece which is designed to be mounted on a connection ring, which plate has a first, lower surface designed to be positioned on the interior side of a timepiece, and an opposite second, upper surface designed to be on view, and comprising a third surface which connects the first and second surfaces, and forms a peripheral contour of the dial plate, wherein said third, peripheral contour surface comprises a section which passes via a plane perpendicular to the second surface, comprising a first part extending from the first, lower surface to the second, upper surface of the dial plate, in a direction which is non-perpendicular to said first, lower surface. This direction is advantageously oriented towards the exterior of the dial plate.

The invention also relates to a connection ring for a dial plate of this type, wherein the ring comprises a connection portion with a connection surface which can undergo elastic deformation, which surface is designed to cooperate by contact with the third, peripheral contour surface of a dial plate.

The invention also relates to a dial for a timepiece, wherein it comprises assembly of a dial plate as described above with a connection ring as described above.

The invention also relates to a timepiece as such, incorporating a dial as defined above. This timepiece can be a wristwatch.

The invention is defined more precisely by the claims.

BRIEF DESCRIPTION OF THE FIGURES

These objectives, characteristics and advantages of the present invention will be described in detail in the following description of a particular embodiment provided by way of non-limiting example in relation with the appended figures, in which.

Figure 1:
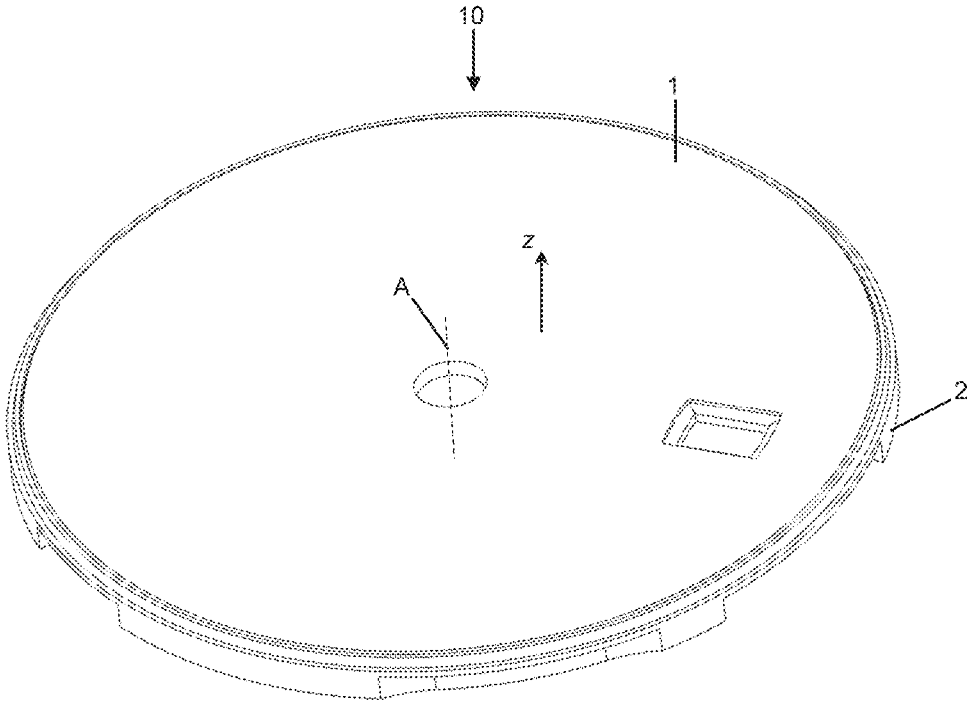
FIG. 1 represents a view in perspective from above of a dial according to an embodiment of the invention.

The invention is based on a dial 10 illustrated by FIG. 1, obtained by mechanical assembly of two distinct components, i.e. a dial plate 1 and a connection ring 2. The connection ring 2 extends below the dial plate 1, on the peripheral part of the dial plate 1, and its purpose is to form a component for removable fastening of the dial 10 on a timepiece blank.

By convention, it has been chosen to define the horizontal direction as any direction on a plane parallel to the horizontal plane, in particular to the surface of the dial plate 1, which can be flat or substantially flat. The vertical direction z is defined by convention as the direction which is perpendicular to a horizontal plane, oriented from the dial plate towards the side which is designed to be on view to a wearer of a watch incorporating the dial plate. According to an embodiment in which the dial plate 1 is not flat, the horizontal direction will be defined starting from a plane which is substantially tangent to the upper surface of the dial plate, and perpendicular to the vertical direction z. According to this convention, which makes it possible to simplify the following description, the adjectives “upper” and “lower” will thus make it possible to characterize elements which are designed respectively to be oriented according to the vertical direction of the side which is on view of a timepiece, and of the opposite side. For example, the upper surface of the dial plate will designate the surface which is on view to a wearer of a wristwatch, and the lower surface of the dial plate will designate the surface which is not on view, oriented towards the interior of a watch, on the side of the wrist of the wearer of the wristwatch. Persons skilled in the art will understand that these terms thus defined can be used irrespective of the form of the dial plate, which is not necessarily circular. In addition, throughout this description, "dial" means any indicator unit which is designed to be mounted in a fixed manner within a watch case. Thus, within the context of the invention, a counter for a time-based indication (a chronograph counter, for example) can be assimilated to a dial.

According to the embodiment illustrated by the figures, the dial plate 1 is in the form of a disc, comprising a narrow thickness (also known as the height, since it is oriented according to the vertical direction according to the convention selected), between a first, flat lower surface 12, which is designed to be oriented towards the interior of a watch, and a second, flat upper surface 13, which is opposite and parallel, and is designed to be on view. This dial plate 1 has a vertical central axis A passing through its center. As a variant, the first, lower surface 12 and/or the second, upper surface 13 need not be flat, but for example can be curved. The surface can have a top in its center. It can be convex or concave. In addition, the dial plate could have a form which is not circular, as will be described hereinafter.

Figure 2:
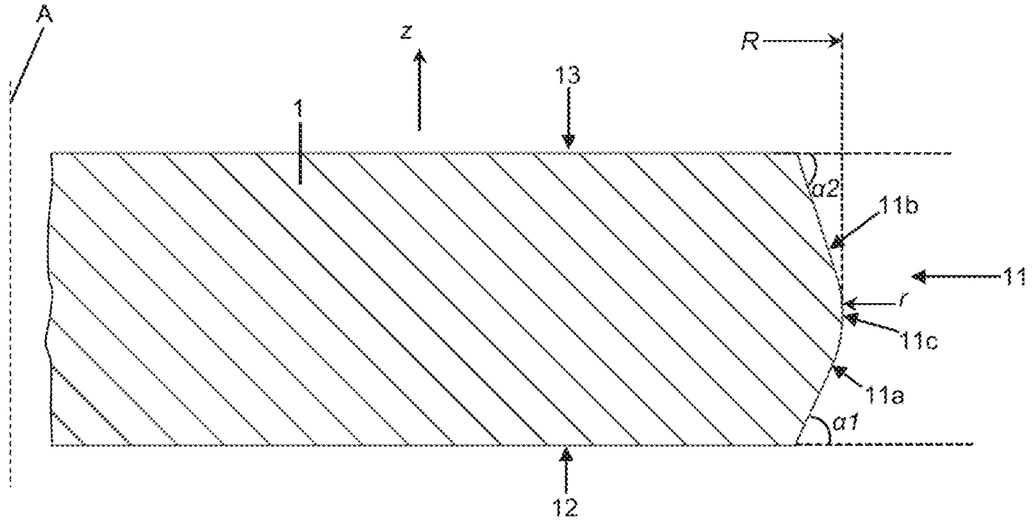
FIG. 2 represents a view in transverse cross-section of a dial plate according to the embodiment of the invention.

FIG. 2 represents a view in cross-section of the dial plate 1 passing via a vertical median plane, i.e. a vertical plane comprising the axis A of the dial plate, or more generally a vertical plane passing through the center of the dial plate 1. This FIG. 2 makes it possible to represent in greater detail a section of a third surface 11 of the dial plate 1, forming a peripheral contour surface of the dial plate 1. This third surface 11 forms the connection between the first, lower surface 12 and/or the second, upper surface 13. It forms an assembly surface of the dial plate 1, as will be described hereinafter. This section of the third surface 11 has the particular feature that it is not oriented in the vertical direction z. In other words, it is not perpendicular, or substantially perpendicular, to the dial plate 1, and more particularly to one or the other of the first and second surfaces 12, 13.

More specifically, the section of the third surface 11 has a particularly advantageous form, comprising in particular:

a first part 11*a* extending from the first, lower surface 12, in a direction which is non-perpendicular to said first, lower surface 12, i.e. which is not aligned with the vertical direction z. This first part 11*a* advantageously extends over at least a quarter of the thickness of the dial plate (in other words, a quarter of the height, considered in the vertical direction z, between the two, first and second surfaces 12, 13); and a second part 11*b* extending from the second, upper surface 13, in a direction which is non-perpendicular to said second, upper surface 13, i.e. which is not aligned with the vertical direction z; and a third part 11*c*, for connection between the first and the second part, forming a peripheral connection area of the dial plate 1, which can cooperate with a dial connection ring 2, which will be described hereinafter.

According to the embodiment, the first part 11*a* and the second part 11*b* of the third surface 11 are thus inclined towards the exterior of the dial plate 1, i.e. in a direction comprising a horizontal component going away from the first and second surfaces 12, 13 of the dial plate 1.

According to this embodiment, the first part 11*a* of the section of the third surface 11 has an inclination with a first angle $\alpha 1$ relative to the first surface 12, and/or relative to a horizontal plane. This first angle $\alpha 1$ is advantageously between 50° and 70°, or between 60° and 70°.

The second part 11*b* of the third surface 11 has an inclination with a second angle $\alpha 2$ relative to the second, upper surface 13 and/or relative to a horizontal plane. This second angle $\alpha 2$ is advantageously between 60° and 80°, or between 65° and 75°.

According to the embodiment, the first angle $\alpha 1$ is advantageously smaller than the second angle $\alpha 2$.

The third part 11*c* has a top, i.e. an area furthest from the upper, second surface 13. This top is substantially positioned in the middle of the thickness of the dial plate 1, or slightly below the horizontal median plane of the dial plate 1. This top consists of a point according to the embodiment.

Advantageously, the third part 11*c* of connection is a rounded portion, in particular with a radius of between 0.1 mm and 0.5 mm. It makes it possible to connect the two parts 11*a* and 11*b* in order to form a continuous curve. This rounded curve advantageously has no roughness.

The first part 11*a* and the second part 11*b* are linear parts which are inclined in the embodiment, but which, as a variant, could have other forms which are not necessarily linear.

Preferably, the third surface 11 of peripheral contour extends around the entire periphery of the dial plate 1. As an alternative, it could extend according to one or a plurality of sectors around the periphery of the dial plate 1. In the embodiment described, the dial plate is a surface of revolution with an axis A. All the sections obtained by a vertical median plane, i.e. a plane which is perpendicular to the second, upper surface 13 comprising its axis and/or its center, advantageously comprise the same form. In other words, the dial plate does preferably not comprise any discontinuity on its peripheral contour, which has a horizontal section presenting a well defined geometry, for example circular, rectangular, polygonal, etc., and particularly without truncation.

As a variant, the dial plate need not be circular, but it could for example be polygonal, square or rectangular. In all cases, it is advantageous for all the sections, or almost all the sections via a vertical median plane, to comprise the same form.

The dial plate 1 can be based on ceramic, in particular a zircon or an alumina, a fluorescent and/or phosphorescent ceramic, or a composite ceramic based on yttriated zircon and Dy/Eu-doped strontium aluminate. It can in particular advantageously be made of "luminescent zircon", for example as described in patent application EP2730636. As a variant, it can be based on composite material. Also as a variant, it can be based on a stone, in particular onyx, opal, turquoise or sapphire, or based on mother-of-pearl. The expression "based on a certain material" means the fact that the dial plate comprises at least 50% by weight, or at least 80% by weight, of said material.

The dial plate 1 can be coated with a layer of varnish, for example a varnish comprising a fluorescent and/or phosphorescent property, such as to modulate the appearance of the dial plate by day and by night. As a variant, the dial 10 can comprise a second solid plate comprising a fluorescent and/or phosphorescent property fastened below the first, lower surface 12 of the dial plate 1.

Figure 3:
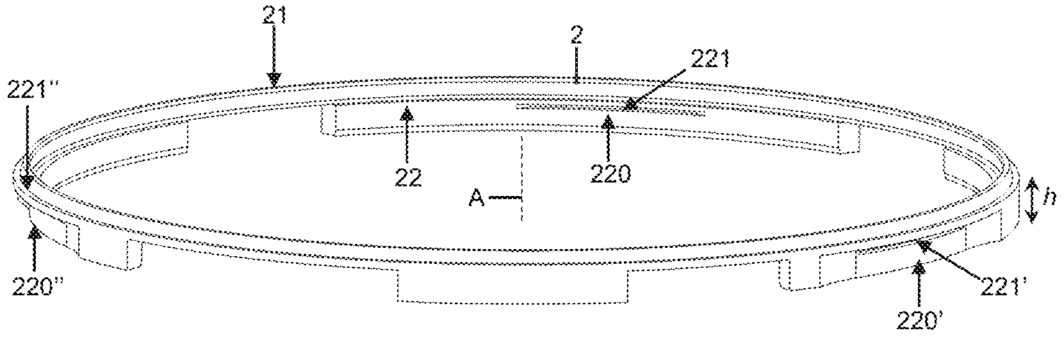
FIG. 3 represents a view in perspective of a connection ring for a dial according to the embodiment of the invention.
Figure 7:
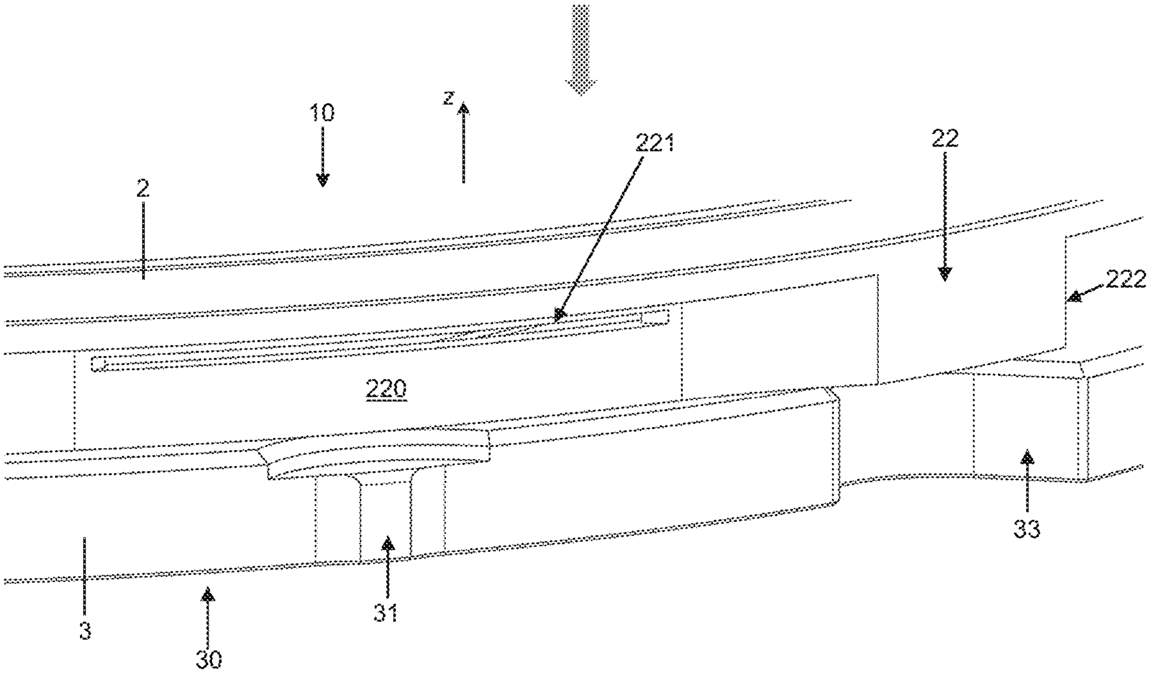
FIG. 7 illustrates an enlarged view of details of the assembly of the dial on a blank according to the embodiment of the invention.

According to the embodiment, the dial 10 comprises in addition a connection ring 2, more particularly represented by FIGS. 3 and 7, which is designed for assembly with the previously described dial plate 1. This connection ring 2 is designed to fulfil the function of assembly of the dial 10 on a blank of a timepiece movement or of a timepiece, as will be described hereinafter. The connection ring 2 is preferably made of metal or metal alloy. It can be made of brass or steel, in particular of Nivaflex®.

The connection ring 2 comprises a connection portion 21 in its upper part, with a connection surface 210 which is designed to cooperate with the third surface 11 of peripheral contour of the dial plate 1. The connection portion 21 is thus designed for fastening of the dial plate 1. According to the embodiment, the connection surface 210 has a frusto-conical form, and can undergo elastic deformation. As a variant, the connection portion 21 could have another form which can undergo elastic deformation. Advantageously, the connection portion comprises at least one section passing through a vertical plane comprising an inclination with respect to the vertical direction, so that its superior extremity is shifted towards the direction of the dial plate or towards the center of the connecting ring, with respect to a direction which would be vertical. At least a part of the connecting portion has thus an inclination towards the center of the connecting ring with respect to a direction perpendicular to the plane of the connecting ring. As detailed below, this connection portion fulfils the function of retention of the dial plate in its assembly configuration. Thus, at least a part of its connection surface 210 remains in direct or indirect contact with the dial plate in its assembly configuration, so as to exert a retention force on said dial plate. Naturally, this retention is preferably reversible, and this connection portion participates to a reversible retention of the dial plate. In addition, the connection portion is configured for bearing on the peripheral contour of the dial plate. With such bearing, it is able to exert a force comprising at least a component oriented towards the dial plate center, particularly a radial component in case of a circular dial plate.

In addition, the connection portion 21 comprises a support surface 211 which is horizontal or substantially horizontal, and is designed to receive the support of a lateral part, or peripheral part, of the first, lower surface 12 of the dial plate 1.

In addition, the connection ring 2 comprises a lower fastening portion, which extends below the connection portion 21, and is designed for fastening of the connection ring 2 on a timepiece blank, and thus for fastening of a dial within a timepiece. According to the embodiment, this lower fastening portion is in the form of a skirt 22 which extends substantially in a direction opposite the connection surface 210, relative to the support surface 211. In other words, the connection portion 21 and the lower fastening portion form portions which are arranged substantially in the vertical direction, and are distributed on both sides of the support surface 211 which is horizontal or substantially horizontal.

The skirt 22 according to the embodiment extends in a vertical direction. It comprises at least one elastic element 220. Preferably, this elastic element 220 extends partly along the height h of the skirt 22. The elastic element 220 is advantageously in the form of a tongue embedded in the wall of the skirt 22. It can for example be in the form of a tongue which is embedded at its two ends. A tongue of this type can extend in a substantially horizontal direction. It can be formed by at least one through slot 221, or cut-out, extending on a horizontal plane, and formed in the wall of the skirt 22. Preferably, the skirt 22 comprises a plurality of elastic elements. According to the embodiment, the skirt 22 comprises three identical elastic elements 220, 220', 220". These three elements are advantageously equidistantly distributed on the periphery of the connection ring 2.

The fastening portion of the connection ring, i.e. the skirt 22 in the embodiment, has a form which is designed to cooperate with a blank of a timepiece, as will be described in detail hereinafter with reference to FIG. 7. This blank thus comprises the form of, and elements which are complementary to, the fastening portion of the connection ring, in order to permit implementation of the fastening function. This fastening is removable. According to the embodiment, this fastening takes place without a tool. It is of the clipping-on or elastic fitting type.

Figure 4:
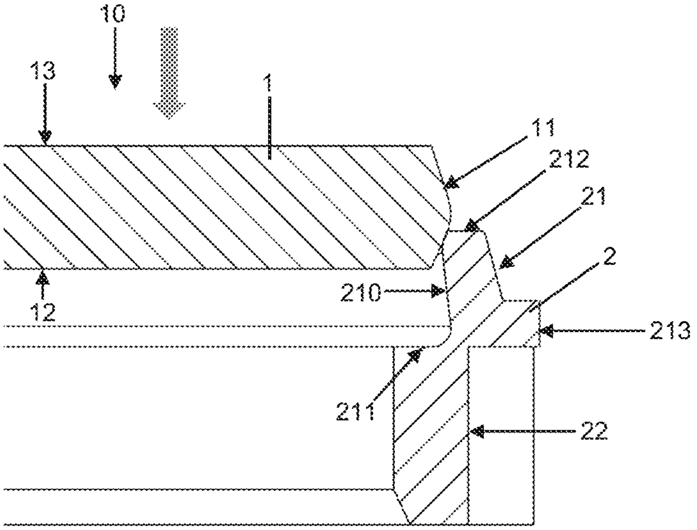
FIGS. 4 to 6 represent views in transverse cross-section in order to illustrate implementation of the assembly of a dial plate with a connection ring according to the embodiment of the invention.
Figure 5:
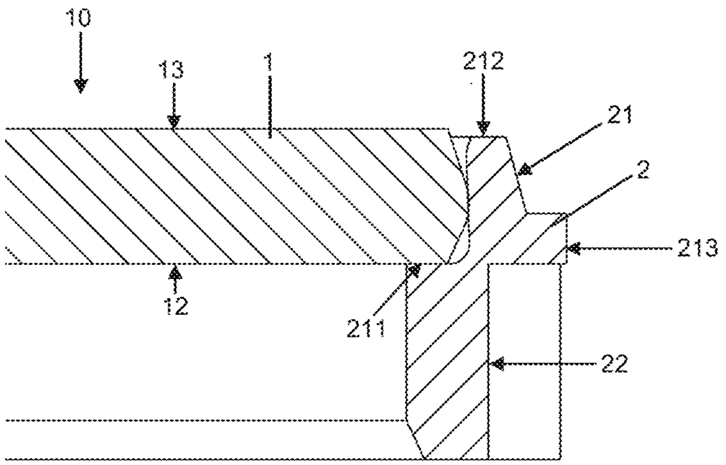
Figure 6:
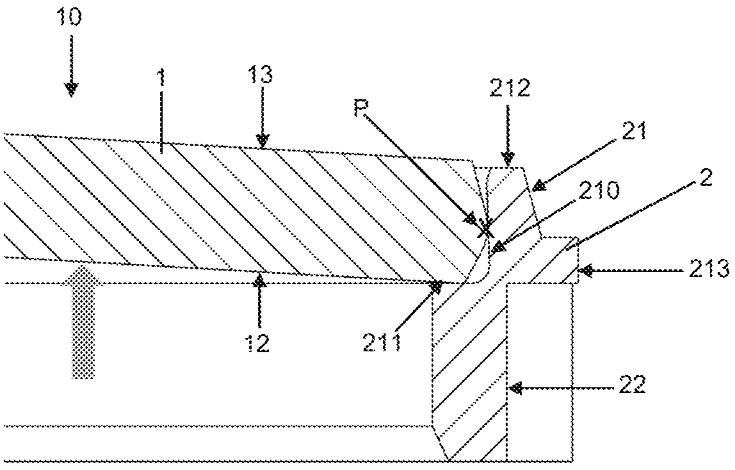

FIGS. 4 to 6 illustrate more precisely the assembly of a dial plate 1 with a connection ring 2. According to the embodiment, the assembly is carried out by driving or clipping on, i.e. by elastic fitting. This assembly is therefore carried out without necessarily using a tool. Nor does it need an intricate operation such as welding or adhesion. In addition it can be reversible and removable.

FIG. 4 illustrates a phase of approach of the dial plate 1 above the connection portion 21 of the connection ring 2. The first part 11*a* of the section of the third surface 11 of the dial plate 1 is supported on the upper end of the connection surface 210 of the connection ring 2. The dimensions of the frusto-conical connection surface 210 are such that the pressure downwards exerted on the dial plate 1 then induces progressive elastic deformation of the connection portion 21 of the connection ring 2 with which the third surface 11 cooperates. Throughout this assembly phase, the third surface 11 of the dial plate 1 thus cooperates with the connection surface 210 by contact. According to the embodiment, the connection portion 21, which is inclined towards the dial plate with respect to a vertical direction in its rest position, is thus moved away towards the vertical direction by contact of its connection surface 210 with the dial plate 1.

The assembly movement is continued until the first, lower surface 12 of the dial plate 1 abuts the support surface 211 of the connection ring 2, as represented in FIG. 5. In this final assembly configuration, only the rounded portion third part 11*c* of the section of the third surface 11 is in contact with the connection surface 210 of the connection ring 2. As a result of the deformation of the connection portion 21, this portion exerts a retention force on the dial plate 1 which allows it to be retained reliably and robustly. In addition, the connection surface 210 of the connection portion 21 of the connection ring 2 has the advantageous particular feature of orienting the retention force downwards, i.e. of exerting a force which tends to place the first, lower surface 12 of the dial plate 1 against the support surface 211 of the connection ring 2. It thus opposes the withdrawal of the dial plate 1, and assists the stable retention thereof. In the final assembly configuration, the connection surface 210 remains in contact with the dial plate 1 so as to maintain it. Moreover, the connection portion 21 remains in a deformed position in the final configuration, so as to exert an elastic restoring force on the dial plate, thus fulfilling a retention function. Advantageously, this restoring force comprises at least a component oriented towards the dial plate center.

It should be noted that the stresses which are exerted by this retention force are concentrated on the portion of third part 11*c*, which advantageously makes it possible to minimize the stresses within the material which constitutes the dial plate, whilst guaranteeing a force of adequate retention of the dial plate on the ring. In the embodiment, the area of contact of the section of the third surface 11 is in fact reduced to a point, which is the previously mentioned top of the third part 11$c$. As a result, the contact between the third surface 11 and the connection surface 210 is a linear or substantially linear contact.

FIG. 6 illustrates a phase of separation of the dial plate 1 from the connection ring 2. For this purpose, pivoting of the dial plate 1 is carried out, for example by levering an area of the dial plate 1. The aforementioned linear or substantially linear contact between the third surface 11 of the dial plate 1 and the connection surface 210 of the connection ring 2 makes it possible to assist this dismantling of the dial plate 1, by defining an advantageous area of pivoting P of the dial plate 1 at its third part 11$c$ of its third surface 11, which plate pivots against the connection surface 210 of the connection portion 21 of the connection ring 2. The ring is elastically deformed during this operation. Thus, the solution according to the embodiment also permits dismantling of the dial plate 1 from the connection ring 2, which is particularly advantageous within the context of any after-sales service operation, for example if it becomes necessary to replace the connection ring 2 or the dial plate 1. The dial plate 1 and the connection ring 2 thus always remain two distinct components, which can be assembled in a removable manner according to the embodiment. As a variant, it could be preferred to create an assembly which is more difficult to dismantle, without departing from the context of the invention, for example by modifying the geometries of the surfaces 11 and 210.

Preferably, as described according to the embodiment, the third surface 11 of the dial plate 1 is an outer peripheral surface of the dial plate 1. In this particular case of a dial plate in the form of a disc, the top of the third part 11$c$ belongs to a circle which is centered on the axis A, the radius R of which, shown in FIG. 2, defines the largest radius of the dial plate 1.

Thanks to this embodiment, the dial plate 1 has the advantage of being able to be made of a fragile material, in particular a material which does not have elastic deformation under stress, as previously stated.

Then, when a dial 10 formed by the assembly of a dial plate 1 and a connection ring 2 is obtained, as illustrated by FIGS. 1 and 5, the dial 10 is ready to be mounted within a timepiece. FIG. 7 illustrates more specifically a phase of fastening of the dial 10, and more specifically of the connection ring 2, according to the embodiment, on a blank 3 of a timepiece. In this figure, the dial 10 is in a phase of approaching above a blank. This blank 3 comprises projecting protuberances 31, which are formed such as to cooperate with the elastic elements 220, 220', 220'' of the connection ring 2. When the dial 10 continues its descent, each tongue 220 is spaced by a protuberance 31, and is elastically deformed. This movement is continued until the first, lower surface 12 of the dial plate 1 abuts the blank 3.

Optionally, the skirt 22 of the connection ring 2 also comprises a surface 222 which is oriented vertically or substantially vertically, and is designed to abut a surface 33 of the blank 3 similarly oriented vertically or substantially vertically. These elements serve the purpose of ensuring angular indexing of the dial on the blank. Alternatively, or in addition, the connection ring 2 can cooperate directly with a middle 4, or any component of a timepiece, such as to permit the angular positioning of the dial 10 within a timepiece.

As is apparent from the preceding description, the connection ring 2 according to the embodiment also has the advantage of permitting assembly of the dial 10 on a timepiece movement, without needing assembly screws or feet, for which spaces would have to be provided within said timepiece movement. It thus remains compatible with incorporation of a dial within a timepiece movement which has little free space for positioning of the dial.

Figure 8:
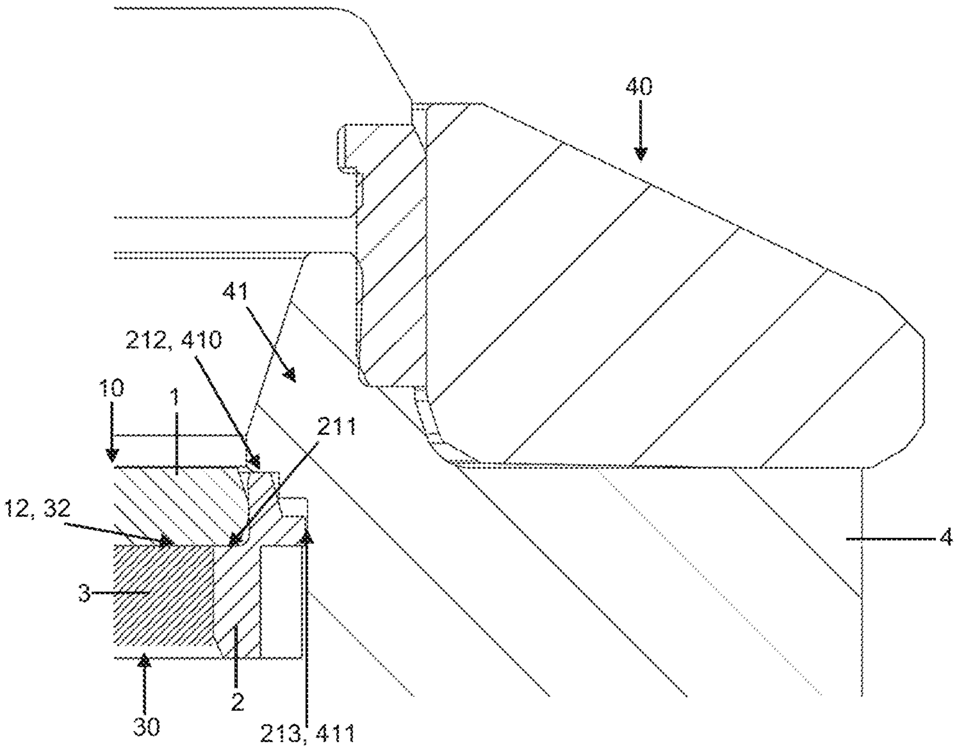
FIG. 8 illustrates a view in transverse cross-section of the arrangement of a dial within a timepiece according to the embodiment of the invention.

FIG. 8 illustrates the final positioning of a dial according to the embodiment of the invention within a timepiece. In this position, the connection ring 2 is fastened on a blank 3 of the timepiece movement 30, as previously described. The first, lower surface 12 of the dial plate 1 is supported on the support surface 211 of the connection ring 2 on its peripheral part, and supported on an upper surface 32 of the blank 3 in the central part of its surface. As a variant, this surface could be positioned against any other stop which is designed to stop the vertical displacement of the dial 10 towards the interior of the timepiece.

In addition, in this embodiment, it appears that the connection ring 2 comprises one or a plurality of specific surfaces which are designed to cooperate with a center 4 of a watch case 40 of the timepiece, in order to make it possible to delimit the axial clearance of the dial 10, and in particular to attenuate the effect of any impacts. For this purpose, the connection ring 2 can comprise a surface 212, which is horizontal or substantially horizontal, arranged at the upper end of its connection portion 21, which surface is positioned such as to abut a horizontal or substantially horizontal surface 410 of the middle 4. It should be noted that this stop or support can deliberately have a gap. According to the embodiment, the horizontal surface 212 of the connection ring 2 is concealed by a flange 41 of the middle 4, the corresponding horizontal surface 410 of which is formed below the flange 41. In addition, the connection ring 2 comprises a surface 213 which is vertical or substantially vertical, and cooperates with a vertical or substantially vertical surface 411 of the middle 4. This cooperation between said two vertical surfaces 213, 411 permits guiding of the dial 10 into the watch case 40. This cooperation takes place by contact. It can comprise a gap. By this means, mounting of the dial can thus be carried out directly between the dial 10 and the case 40, independently of the timepiece movement 30 comprising the blank 3 on which the dial 10 is mounted. A solution of this type is thus particularly advantageous in the precision of assembly of a dial within a watch case, thus making it possible to reduce the chain of dimensions involved in the assembly.

It will be appreciated that the invention is not limited to the embodiment described, and the dial according to the embodiment of the invention continues to be compatible for mounting in any timepiece, not necessarily according to the particular arrangement represented by way of example in FIG. 8.

The invention claimed is:

1. A dial plate for a timepiece, the dial plate being designed to be mounted on a connection ring, the dial plate comprising:

a first, lower surface designed to be positioned on an interior side of a timepiece, an opposite second, upper surface designed to be on view, and a third surface connecting the first and second surfaces and forming a peripheral contour of the dial plate, wherein the third surface comprises a section comprising:

a first part extending from the first, lower surface towards the second, upper surface of the dial plate, in a first direction which is non-perpendicular to the first, lower surface, wherein the first direction is inclined towards an exterior of the dial plate and comprises a component parallel to the first, lower surface and oriented radially away from the first and second surfaces, and a second part extending from the second, upper surface towards the first, lower surface of the dial plate, in a second direction which is non-perpendicular to the second, upper surface, wherein the second direction is inclined towards an exterior of the dial plate and comprises a component parallel to the second. upper surface and oriented radially away from the first and second surfaces.

2. The dial plate for a timepiece as claimed in claim 1, wherein the section of the third surface additionally comprises:

a third part, for connection between the first and the second part, the third part forming a peripheral connection area of the dial plate, and being adapted to cooperate with the dial connection ring.

3. The dial plate for a timepiece as claimed in claim 2, wherein a portion of the third part located furthest from the upper, second surface along a direction parallel to the upper, second surface is substantially positioned in a middle of a thickness of the dial plate along a direction perpendicular to the upper, second surface.

4. The dial plate for a timepiece as claimed in claim 1, wherein the first part of the section of the third surface extends over a height representing at least a quarter of a thickness of the dial plate.

5. The dial plate for a timepiece as claimed in claim 4, wherein the first part of the third surface has an inclination with a first angle al relative to the first, lower surface, wherein the second part of the third surface has an inclination with a second angle $\alpha 2$ relative to the second, upper surface, and wherein the first angle al is in a range of from 50° to 70° and the second angle $\alpha 2$ is in a range of from 60° to 80°.

6. The dial plate for a timepiece as claimed in claim 5, wherein the first angle $\alpha 1$ is in a range of from 60° to 70° and the second angle $\alpha 2$ is in a range of from 65° to 75°.

7. The dial plate for a timepiece as claimed in claim 2, wherein the third part is a rounded portion.

8. The dial plate for a timepiece as claimed in claim 7, wherein the rounded portion has a radius in a range of from 0.1 mm to 0.5 mm.

9. The dial plate for a timepiece as claimed in claim 1, wherein the dial plate is based on at least one selected from the group consisting of ceramic, composite material, stone, or mother-of-pearl.

10. A dial for a timepiece, wherein the dial comprises an assembly of the dial plate as claimed in claim 1 with a connection ring, wherein the connection ring comprises a connection portion having a connection surface which is adapted to undergo elastic deformation, the connection surface being designed to cooperate by contact with the third surface of the dial plate, and wherein the assembly having been carried out by driving, the connection portion of the connection ring includes an elastic deformation with which the third surface of the dial plate cooperates, so as to ensure retention of the dial plate in assembly configuration with the connecting ring.

11. The dial as claimed in claim 10, wherein the connection portion comprises a skirt comprising at least one elastic element forming a tongue embedded in a wall of the skirt, the tongue entirely extending along a portion of a height of the skirt.

12. The dial plate as claimed in claim 10, wherein at least one selected from the group consisting of (i) the connection surface has a frusto-conical form, and (ii) the connection portion includes a part having an inclination upwards and towards a center of the connecting ring relatively to a direction perpendicular to a main plane of the connecting ring.

13. A connection ring for a dial plate, wherein the connection ring comprises:

a connection portion having a connection surface which is adapted to undergo elastic deformation, the connection portion comprising a skirt comprising at least one elastic element forming a tongue embedded in a wall of the skirt, the tongue entirely extending along a portion of a height of the skirt, wherein the connection surface is designed to cooperate with a dial plate comprising a first, lower surface designed to be positioned on an interior side of a timepiece, an opposite second, upper surface designed to be on view, and a third surface connecting the first and second surfaces and forming a peripheral contour of the dial plate, wherein the connection surface is designed to cooperate by contact with the third surface comprising a section comprising;

a first part extending from the first, lower surface towards the second, upper surface of the dial plate, in a first direction which is non-perpendicular to the first, lower surface, wherein the first direction is inclined towards an exterior of the dial plate and comprises a component parallel to the first, lower surface and oriented radially away from the first and second surfaces, and a second part extending from the second. upper surface towards the first, lower surface of the dial plate, in a second direction which is non-perpendicular to the second, upper surface, wherein the second direction is inclined towards an exterior of the dial plate and comprises a component parallel to the second, upper surface and oriented radially away from the first and second surfaces, so as to ensure retention of the dial plate in an assembly configuration with the connecting ring.

14. The connection ring for a dial plate as claimed in claim 13, wherein at least one selected from the group consisting of (i) the connection surface has a frusto-conical form, and (ii) the connection portion includes a part having an inclination upwards and towards a center of the connecting ring relatively to a direction perpendicular to a main plane of the connecting ring.

15. The dial plate for a timepiece as claimed in claim 14, wherein the dial plate is based on ceramic and the ceramic is selected from the group consisting of zircon, alumina, fluorescent and/or phosphorescent ceramic, composite ceramic based on yttriated zircon and Dy/Eu-doped strontium aluminate.

16. The connection ring for a dial plate as claimed in claim 13, wherein the skirt extending substantially in a direction opposite the connection surface relative to a support surface.

17. A dial for a timepiece, wherein the dial comprises an assembly of a dial plate with the connection ring as claimed in claim 13, wherein the dial plate comprises a first, lower surface designed to be positioned on an interior side of a timepiece, an opposite second, upper surface designed to be on view, and a third surface connecting the first and second surfaces and forming a peripheral contour of the dial plate, the third surface comprising a section comprising a first part extending from the first, lower surface to the second, upper surface of the dial plate, in a direction which is non-perpendicular to the first, lower surface, wherein the direction is inclined towards an exterior of the dial plate and comprises a component parallel to the first, lower surface and oriented radially away from the first and second surfaces, wherein the assembly having been carried out by driving, the connection portion of the connection ring includes an elastic deformation with which the third surface of the dial plate cooperates, so as to ensure retention of the dial plate in assembly configuration with the connecting ring.

18. The dial for a timepiece as claimed in claim 17, wherein the third surface of the dial plate has a linear or substantially linear contact with the connection surface of the connection portion.

19. A timepiece, wherein the timepiece comprises a dial as claimed in claim 17.

20. The timepiece as claimed in claim 19, wherein the connection ring of the dial is fastened on a blank of a timepiece movement.

21. The timepiece as claimed in claim 19, wherein the timepiece comprises a middle, the connection ring comprises a surface which is at least one selected from the group consisting of (i) horizontal or substantially horizontal and (ii) vertical or substantially vertical, wherein the middle comprises a surface which is horizontal or substantially horizontal and capable of being supported on the horizontal surface of the connection ring, and (ii) vertical or substantially vertical, wherein the middle comprises a surface which is vertical or substantially vertical, and capable of being in contact with the vertical surface of the connection ring.

* * * * *